US011782589B2

(12) United States Patent
Kaneshige

(10) Patent No.: US 11,782,589 B2
(45) Date of Patent: Oct. 10, 2023

(54) DEVELOPMENT ASSISTANCE DEVICE, METHOD FOR CONTROLLING DEVELOPMENT ASSISTANCE DEVICE, AND RECORDING MEDIA

(71) Applicant: OMRON Corporation, Kyoto (JP)

(72) Inventor: Naruhiko Kaneshige, Otsu (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/439,793

(22) PCT Filed: Feb. 18, 2020

(86) PCT No.: PCT/JP2020/006358
§ 371 (c)(1),
(2) Date: Sep. 15, 2021

(87) PCT Pub. No.: WO2020/195357
PCT Pub. Date: Oct. 1, 2020

(65) Prior Publication Data
US 2022/0179550 A1 Jun. 9, 2022

(30) Foreign Application Priority Data
Mar. 28, 2019 (JP) .................................. 2019-064685

(51) Int. Cl.
*G06F 3/04847* (2022.01)
*G06F 3/04845* (2022.01)
(Continued)

(52) U.S. Cl.
CPC ...... *G06F 3/04847* (2013.01); *G06F 3/04845* (2013.01); *G06F 40/109* (2020.01);
(Continued)

(58) Field of Classification Search
CPC ............ G06F 3/04847; G06F 3/04845; G06F 40/109; G06F 2203/04804; G06T 11/001; G06T 2200/24; G06T 2210/62
See application file for complete search history.

(56) References Cited

U.S. PATENT DOCUMENTS 9,639,528 B1 * 5/2017 Hoffmann ............. G06F 40/169
2011/0209044 A1 * 8/2011 Kutsumi ................. G06T 11/60
715/230

(Continued)

FOREIGN PATENT DOCUMENTS

JP 2007079946 3/2007
JP 2007079946 A * 3/2007
(Continued)

OTHER PUBLICATIONS

Satake, "Display Device and Method of Displaying Translation Result" (English Translation of JP 2007079946 A) (Year: 2007).*
(Continued)

*Primary Examiner* — John T Repsher, III
(74) *Attorney, Agent, or Firm* — JCIPRNET

(57) ABSTRACT

The purpose of the present invention is to make it possible for a user to easily confirm whether all of character strings being displayed in respective display modes can be accommodated in a common display region. A development assistance device (10) causes a plurality of character strings (CS)
(Continued)

each being displayed in a corresponding one of a plurality of display modes to be simultaneously displayed over an image (P0).

7 Claims, 8 Drawing Sheets

(51) Int. Cl.
*G06F 40/109* (2020.01)
*G06T 11/00* (2006.01)

(52) U.S. Cl.
CPC .. *G06T 11/001* (2013.01); *G06F 2203/04804* (2013.01); *G06T 2200/24* (2013.01); *G06T 2210/62* (2013.01)

(56) References Cited

U.S. PATENT DOCUMENTS

| | | | | |
|---|---|---|---|---|
| 2015/0128037 A1* | 5/2015 | Lee | ................ | G06F 3/0481 715/703 |
| 2015/0234812 A1* | 8/2015 | Vukosavljevic | ...... | G06F 40/103 704/2 |
| 2015/0347396 A1* | 12/2015 | Goldberger | ............. | G06F 9/454 704/3 |
| 2016/0162166 A1* | 6/2016 | Kleine-Horst | ........ | G06F 40/166 715/762 |
| 2019/0188004 A1* | 6/2019 | Wisgo | ..................... | G06F 40/45 |

FOREIGN PATENT DOCUMENTS

| | | |
|---|---|---|
| JP | 2007140986 | 6/2007 |
| JP | 2010262559 | 11/2010 |
| JP | 2015035142 | 2/2015 |

OTHER PUBLICATIONS

"International Search Report (Form PCT/ISA/210) of PCT/JP2020/006358," dated Mar. 31, 2020, with English translation thereof, pp. 1-4.

"Written Opinion of the International Searching Authority (Form PCT/ISA/237) of PCT/JP2020/006358," dated Mar. 31, 2020, with English translation thereof, pp. 1-6.

* cited by examiner (A)

(B)

(C)

(A)

(B)

(C)

DEVELOPMENT ASSISTANCE DEVICE, METHOD FOR CONTROLLING DEVELOPMENT ASSISTANCE DEVICE, AND RECORDING MEDIA

CROSS-REFERENCE TO RELATED APPLICATION

This application is a 371 application of the International PCT application serial no. PCT/JP2020/006358, filed on Feb. 18, 2020, which claims the priority benefits of Japan Patent Application No. 2019-064685, filed on Mar. 28, 2019. The entirety of each of the above-mentioned patent applications is hereby incorporated by reference herein and made a part of this specification.

BACKGROUND

Technical Field

The present invention relates to a development assistance device or the like that assists a user in examining display settings of each of a plurality of character strings, each of which is displayed in a corresponding one of a plurality of display modes.

Related Art

Conventionally, an information processing device is known which is used for adjusting display settings of characters or the like displayed on a human machine interface (HMI) such as a programmable display or the like. For example, Patent literature 1 below discloses the following techniques for improving the visibility of characters displayed on a programmable display. In other words, Patent literature 1 discloses an information processing device that compares the visibility of a display format in which all characters are the same size and displayed in a single line with the visibility of a display format in which all characters are the same size and displayed in multiple lines, and sends the display format with higher visibility to the programmable display.

LITERATURE OF RELATED ART

Patent Literature

Patent literature 1: Japanese Patent Laid-Open No. 2015-35142

SUMMARY

Problems to be Solved

However, the above-mentioned prior art does not suggest an adjustment for a plurality of character strings each of which is displayed in a corresponding one of a plurality of display modes, in the size of a display region commonly allocated to the plurality of character strings, and the character font and character size of each of the plurality of character strings.

For example, a multi-language HMI displays, in a common display region, character strings of a language in a corresponding one of a plurality of language modes, such as an English display mode, a Japanese display mode, a Chinese display mode, a Spanish display mode, or the like. In addition, depending on a user's selection of a display mode for expert or a display mode for beginner, the HMI may display a character string for expert or a character string for beginner in the common display region.

With reference to FIG. 8 and FIG. 9, description is made on a conventional method for adjusting display settings of each of a plurality of character strings displayed in a common display region in a corresponding one of a plurality of display modes.

FIG. 8 is a diagram showing an example of a screen displayed by the multi-language HMI when the English display mode is selected. In the screen example illustrated in FIG. 8, because the English display mode is selected, a soft button with a character string "Alarm & Events" written in English is displayed in the upper right corner of the screen.

FIG. 9 is a diagram showing a method for a user to adjust display settings of each of a plurality of character strings by using a conventional development assistance device when the HMI displays different character strings in the common display region depending on the selected display mode. Specifically, FIG. 9 shows a method for a user to adjust display settings in each of the English display mode and the Spanish display mode by using the conventional development assistance device when different character strings are displayed in the common display region in the English display mode and the Spanish display mode.

The conventional development assistance device displays an editing screen on a display unit of its own device for the user to edit and adjust a "screen displayed by the HMI according to the display mode (in particular, display settings of a 'character string displayed in the common display region by the HMI according to the display mode')". The "screen displayed by the HMI according to the display mode" displayed in the editing screen by the conventional development assistance device corresponds to the "screen that the HMI displays according to the display mode", and may be a reduced or enlarged version of the "screen that the HMI displays according to the display mode". Similarly, the "character string displayed in the common display region by the HMI according to the display mode" displayed in the editing screen by the conventional development assistance device corresponds to the "character string that the HMI displays in the common display region according to the display mode". The "character string displayed in the common display region by the HMI according to the display mode" displayed in the editing screen by the conventional development assistance device may be a reduced or enlarged version of the "character string that the HMI displays in the common display region according to the display mode".

In particular, FIG. 9 shows a method for a user to adjust display settings of a character string which is displayed over a graphical user interface (GUI) component such as a soft button or the like according to a display mode, by using the conventional development assistance device. For example, "a character string for each selected display mode that indicates the name or the like of the GUI component" is displayed over the GUI component. That is, with regard to a plurality of character strings indicating "the name or the like of the GUI component", each of which is displayed over the GUI component for each display mode, the display region of the plurality of character strings corresponds to the display region of the GUI component.

The user adjusts display settings of each of the plurality of "character strings for each selected display mode that indicate the name or the like of the GUI component" so that all of the plurality of "character strings for each selected display mode that indicate the name or the like of the GUI component" are accommodated in a display region of the common GUI component.

For example, the user adjusts the size of the display region common to the plurality of "character strings for each selected display mode that indicate the name or the like of the GUI component", that is, the size of the display region of the GUI component common to the plurality of "character strings for each selected display mode that indicate the name or the like of the GUI component". In addition, for example, the user adjusts at least one of the character font and the character size of each of the plurality of "character strings for each selected display mode that indicate the name or the like of the GUI component" so as to allow the plurality of "character strings for each selected display mode that indicate the name or the like of the GUI component" to be accommodated in the display region of the common GUI component.

FIG. 9 shows an example in which the user uses the conventional development assistance device to adjust the size of the display region of the GUI component, that is, the size of the display region common to the plurality of "character strings for each selected display mode that indicate the name or the like of the GUI component".

The conventional development assistance device displays, in the editing screen, the "character strings for each selected display mode (for example, language mode)" over the common display region (for example, the common GUI component). The user switches the language mode (that is, the display mode) to be selected, finds out the longest character string of the plurality of character strings each being displayed in the common display region, and sets the size of the display region (here, the GUI component) according to the longest character string.

The character font and character size of each of character strings CS1 and CS2 displayed in the editing screen shown in FIG. 9 correspond to the character font and character size of each of character strings CS1 and CS2 displayed on the HMI. The size of an image P0 displayed in the editing screen shown in FIG. 9 corresponds to the size of a display region commonly allocated to the character strings CS1 and CS2 on the HMI (for example, the size of the GUI component in which the character string CS1 or CS2 is displayed on the HMI).

For example, as shown in (A) of FIG. 9, when English (that is, English display mode) is selected, the character string displayed over the image P0 is the character string CS1 of "Alarm & Events" written in English. The character string CS1 is accommodated in the image P0.

In contrast, as shown in (B) of FIG. 9, when Spanish (that is, Spanish display mode) is selected, the character string displayed over the image P0 is the character string CS2 of "Alarmas & Eventos" written in Spanish. The character string CS2 is longer than the character string CS1 (Alarm & Events) and is not accommodated in the image P0. Therefore, the user sets the size of the image P0 according to the character string CS2 (Alarmas & Eventos), which is longer than the character string CS1 (Alarm & Events).

This conventional method of "switching the display mode to find out 'the longest character string of the plurality of character strings each being displayed in the common display region' and adjusting the display settings such as the size of the display region or the like according to the longest character string" has the following problem. That is, the problem with the conventional method is that, the more the selectable display modes (for example, language modes), the greater the number of operations required to determine the display settings of the plurality of character strings, each of which is displayed in a corresponding one of a plurality of display modes.

For example, the user selects the plurality of selectable display modes one by one, and confirms the length of the character string displayed in each display mode. Then, the user selects, from the plurality of selectable display modes, a display mode in which the length of the displayed character string is the longest. Subsequently, the user adjusts the size of the display region according to the length of the character string displayed in the selected display mode. In the example of FIG. 9, the user sets the size of the image P0 common to the character string CS1 and the character string CS2 according to the character string CS2, which is longer than the character string CS1.

As described above, conventionally, the user switches the display mode (for example, language mode) to confirm which character string CS is the longest, and adjusts the size of the display region (for example, the image P0) common to the plurality of character strings CS based on the longest character string CS. In the example of FIG. 9, if the size of the image P0 is determined based on the English character string CS1 ((A) of FIG. 9), the Spanish character string CS2 will not be accommodated in the image P0 because the Spanish character string CS2 is longer than the character string CS1. In (B) of FIG. 9, the character string CS2 is not accommodated in the image P0 that is set based on the character string CS1, but is displayed in a folded manner, and the character string CS2 is displayed with a part missing. Therefore, the user determines the size of the image P0 based on the character string CS2 ((C) of FIG. 9) again.

This conventional method has a problem that as the number of the selectable display modes increases, the burden on the user increases, even when only the size of the display region is adjusted and the character font and character size in each display mode are not adjusted.

One aspect of the present invention has been made in view of the above problems, and an object thereof is to enable the user to easily confirm whether all of the plurality of character strings, each of which is displayed in a corresponding one of a plurality of display modes, are accommodated in the display region commonly allocated to the plurality of character strings.

Means to Solve Problems

In order to solve the above problems, a development assistance device according to one aspect of the present invention is a development assistance device that assists a user in examining display settings of each of a plurality of character strings, each of which is displayed in a corresponding one of a plurality of display modes. The development assistance device includes: an image display unit that displays an image having a size corresponding to the size of a display region commonly allocated to the plurality of character strings; and a character display unit that simultaneously displays the plurality of character strings over the image displayed by the image display unit.

In order to solve the above problems, a control method according to one aspect of the present invention is a method for controlling a development assistance device that assists a user in examining display settings of each of a plurality of character strings, each of which is displayed in a corresponding one of a plurality of display modes. This method includes: an image display step in which an image having a size corresponding to the size of a display region commonly allocated to the plurality of character strings is displayed;

and a character display step in which the plurality of character strings are simultaneously displayed over the image displayed by the image display step.

Effect

According to one aspect of the present invention, the development assistance device has an effect of enabling the user to easily confirm whether all of the plurality of character strings, each of which is displayed in a corresponding one of a plurality of display modes, are accommodated in the display region commonly allocated to the plurality of character strings.

DESCRIPTION OF THE EMBODIMENTS

Embodiment 1

Figure 1:
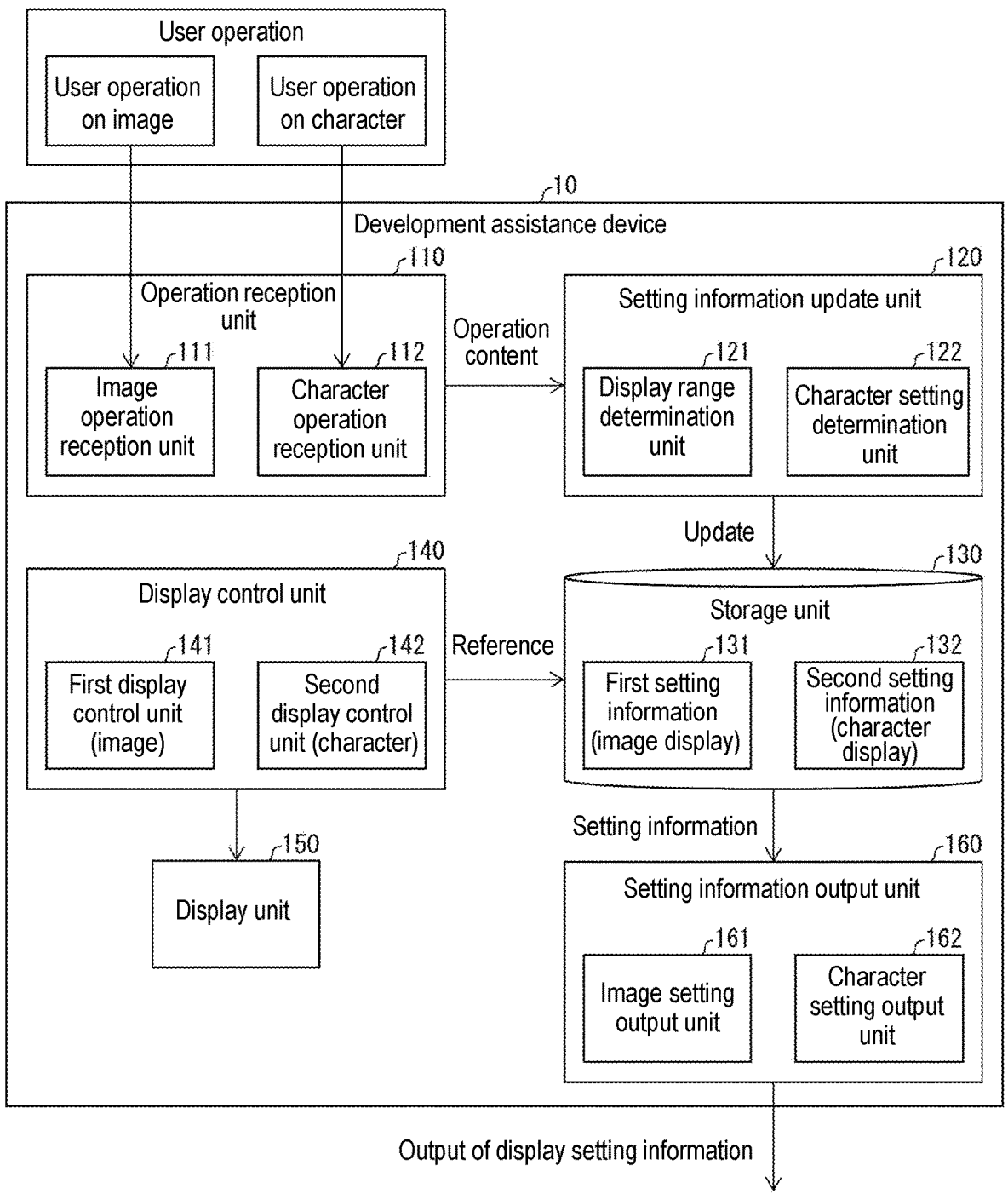
FIG. 1 is a block diagram showing a main configuration of a development assistance device according to a first embodiment of the present invention.

Hereinafter, an embodiment according to one aspect of the present invention (hereinafter, also referred to as "the present embodiment") is described with reference to FIGS. 1 to 9. Note that, the same or corresponding parts in the drawings are designated by the same reference signs, and the description thereof is not repeated. In the present embodiment, for example, a development assistance device 10 is described as a typical example of a development assistance device. In order to facilitate understanding of the development assistance device 10 according to one aspect of the present invention, first, an overview of a control system 1 including the development assistance device 10 is described with reference to FIG. 2.

Figure 2:
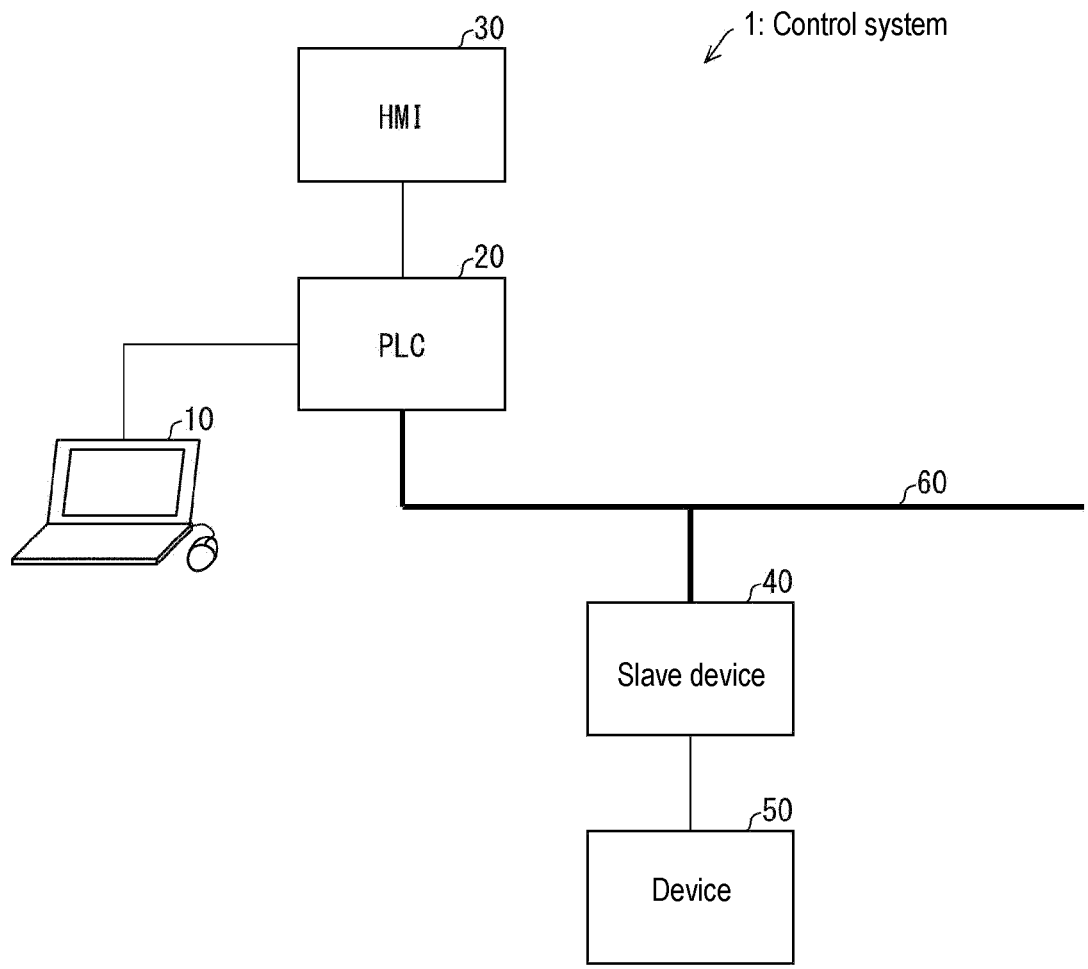
FIG. 2 is a diagram showing an overall overview of a control system including the development assistance device of FIG. 1.

§ 1. Application Example (Overview of Control System)
FIG. 2 is a diagram showing an overall overview of the control system 1 including the development assistance device 10. The control system 1 is a master-slave control system including a programmable logic controller (PLC) 20 serving as a master device and one or more slave devices 40 that are connected to the master device via a network (field network 60). The PLC 20 is called a "master device" in the sense that the PLC 20 manages data transmission performed via the field network 60.

When a plurality of the PLCs 20 are connected to the field network 60, one of the PLC 20 may be the master device and the remaining PLCs 20 may be the slave devices. In addition, a control entity different from either the PLC 20 or the slave device 40 may be the master device. That is, the "master device" and the "slave device" are defined by focusing on a control function of the data transmission on the field network 60, and there are no restrictions on what information is transmitted and received between the devices.

The PLC 20 controls the entire control system 1. Specifically, the PLC 20 acquires information from a device 50, which is an input device such as a sensor or the like, as input data via the slave device 40. The PLC 20 executes arithmetic processing using the acquired input data according to a pre-built user program. The PLC 20 executes the arithmetic processing to determine control contents for the device 50 being an output device such as an actuator or the like, and outputs control data corresponding to the control contents to the device 50 via the slave device 40.

The field network 60 transmits various data received or transmitted by the PLC 20, and is, for example, EtherCAT (registered trademark), PROFINET (registered trademark), MECHATROLINK (registered trademark)-III, Powerlink, SERCOS (registered trademark)-III, or CIP Motion. In addition, the field network 60 may be, for example, EtherNet/IP (registered trademark), DeviceNet, CompoNet (registered trademark), or the like. Moreover, in the following, description is made on the control system 1 in which data is transmitted and received between the PLC 20 and the slave device 40, or between a plurality of the slave devices 40 by sequentially transferring data frames over the field network 60.

The slave device 40 is a slave device in a network (field network 60) using the PLC 20 as the master device, and is, for example, a device communication management unit such as a communication coupler that manages communication with the device 50. The slave device 40 may be a servo driver that is directly connected to the field network 60. The device 50 is, for example, an input device such as a sensor or the like, or an output device such as an actuator or the like. One or more devices 50 are connected to the slave device 40 via a communication cable.

The development assistance device 10 is connected to the PLC 20 via, for example, a communication cable being a universal serial bus (USB) cable. The development assistance device 10 is an information processing device for generating a user program executed by the PLC 20, various setting information for the control system 1, and the like.

The development assistance device 10 provides, for example, a development environment for the PLC 20, and provides an environment for a user to create (create/edit) a user program according to a control purpose (for example, a target line and process). The user creates a program code of a control program (user program) to be executed by the PLC 20 using the development environment (programming tool) provided by the development assistance device 10. The development assistance device 10 may have a debugging function and a simulation function to assist the user in creating and editing the control program to be executed by the PLC 20.

In addition, the development assistance device 10 may calculate and set, for example, a timing for acquiring a state value (input refresh) by the PLC 20 and a timing for updating an output value (output refresh) by the PLC 20. The development assistance device 10 may also monitor an operating state of the PLC 20, values of various data, and the like.

That is, the development assistance device 10 may be a device that provides an integrated development environment for supporting 3D motion simulation in addition to programming, configuration (configuration setting), debugging, maintenance, and monitoring functions of the PLC 20. In addition, the development assistance device 10 may set and adjust various parameters for the slave device 40.

Typically, the development assistance device 10 is constituted of a general-purpose computer. For example, an information processing program executed by the development assistance device 10 may be stored and distributed in a compact disk-read only memory (CD-ROM), which is not shown. The program stored in the CD-ROM is read by a CD-ROM drive device (not shown) and stored in a hard disk or the like of the development assistance device 10. Alternatively, the development assistance device 10 may be configured to download a program similar to the program stored in the CD-ROM from a higher-level host computer or the like via a network.

As shown in FIG. 2, a human machine interface (HMI) 30 may be connected to the PLC 20 via a communication cable. The HMI 30 is a means for exchanging information between a human and a machine. Specifically, the HMI 30 is a means for a human to operate a machine (give instructions to the machine) and for the machine to inform the human of current state/results. With regard to the HMI 30, a means by which the human gives instructions to the machine includes a switch, a button, a handle, a dial, a pedal, a remote controller, a microphone, a keyboard, a mouse, and the like, and a means by which the machine informs information related to the current state, results, and the like, to the human includes a liquid crystal screen, a meter, a lamp, a speaker, and the like.

The HMI 30 includes a display unit, an operation unit, a communication unit that communicates with the PLC 20, and a control unit that controls each unit. The HMI 30 can change various settings of the control system 1 (for example, the PLC 20) according to the user's operation on the operation unit. In addition, the display unit of the HMI 30 displays predetermined information about the control system 1.

The development assistance device 10 supports to enable the user to easily set display settings of character strings to be displayed in a common display region by a display such as the HMI 30 or the like in each of a plurality of display modes. For example, the development assistance device 10 superimposes a plurality of character strings written in each language, which are displayed in a common display region by a multi-language HMI, on a display region corresponding to the common display region in the HMI in an editing screen of the device, and displays the plurality of character strings simultaneously in a semi-transparent color.

Therefore, the user can confirm at a glance the longest character string of the plurality of character strings written in each language in the editing screen of the development assistance device 10, that is, the user can confirm whether the plurality of character strings are all accommodated in the common display region by a single operation. The user can simultaneously confirm whether each of the plurality of character strings CS written in each language is accommodated in the common display region, and can easily adjust the size of the display region common to the plurality of character strings, the character font and character size of each of the plurality of character strings CS, and the like.

In the following description, each of the plurality of character strings CS is, for example, a character string that is displayed in the common display region by the multi-language HMI according to the selected language mode, for example, a character string written in English, Spanish, Japanese, Chinese, or the like. Each of the plurality of character strings CS may be, for example, a character string for expert or a character string for beginner that is displayed in the common display region by the HMI, depending on selection of a display mode for expert or a display mode for beginner. Each of the plurality of character strings CS may be a character string that is displayed in a corresponding one of a plurality of display modes and that is displayed in the common display region. Each of the plurality of character strings CS, for example, a character string CS1, a character string CS2, a character string CS3, . . . , a character string CSn ("n" is a natural number greater than or equal to 2) is simply referred to as "character string CS" if there is no need to distinguish the plurality of character strings CS.

§ 2. Configuration Example

The overview of the control system 1 has been described with reference to FIG. 2. Next, the details of the development assistance device 10 is described. The following is an overview of the development assistance device 10, which is described in detail using FIG. 1 and other diagrams.

That is, the development assistance device 10 is a development assistance device that assists the user in examining display settings of each of the plurality of character strings (for example, the character strings CS1, CS2, and CS3), each of which is displayed in a corresponding one of a plurality of display modes. For example, the development assistance device 10 assists the user in checking and adjusting the size of the display region commonly allocated to the plurality of character strings CS when displayed by an external display device such as the HMI 30 or the like, and the character font and character size of each of the plurality of character strings CS displayed by the HMI 30.

The development assistance device 10 includes a first display control unit 141 (image display unit) that displays an image P0 having a size corresponding to the size of a display region commonly allocated to the plurality of character strings CS (for example, the display region commonly allocated to the plurality of character strings CS when displayed by the HMI 30), and a second display control unit 142 (character display unit) that simultaneously displays the plurality of character strings CS over the image P0 displayed by the first display control unit 141.

According to the above configuration, the development assistance device 10 simultaneously displays the plurality of character strings CS over the image P0. Therefore, the development assistance device 10 has an effect of enabling the user to easily confirm whether all of the plurality of character strings CS each of which is displayed in a corresponding one of a plurality of display modes are accommodated in the display region commonly allocated to the plurality of character strings CS.

Here, each of the plurality of display modes may be, for example, an English display mode, a Japanese display mode, a Chinese display mode, a Spanish display mode, or the like for multi-language support. In addition, each of the plurality of display modes may be, for example, a display mode for expert or a display mode for beginner, which is selected by the user who checks the screen of the HMI 30 in which the character string CS is displayed, depending on his/her own knowledge, experience, skill level, or the like in regard to an object to be confirmed.

In the development assistance device 10, the size of the display region is the size of a display region of a graphical user interface (GUI) component such as a soft button or the like, and each of the plurality of character strings CS may be a character string indicating the name of the GUI component and written in a corresponding one of a plurality of languages. In other words, the first display control unit 141 displays the image P0 having a size corresponding to the size of the GUI component commonly allocated to the plurality of character strings CS when displayed by the HMI 30. In addition, the second display control unit 142 simultaneously displays each of the plurality of character strings CS over the image P0 in a character font and character size corresponding to the character font and character size of each of the plurality of character strings CS when displayed by the HMI 30.

According to the above configuration, the development assistance device 10 simultaneously displays all of the plurality of character strings CS, each of which indicates the name of the GUI component, over the image P0 that has a size corresponding to the size of the display region of the GUI component such as a soft button or the like.

Therefore, the development assistance device 10 has an effect of enabling the user to easily confirm whether the plurality of names of the GUI component, each of which is displayed in a corresponding one of a plurality of display modes, are all accommodated in the display region of the GUI component. For example, the development assistance device 10 has an effect of enabling the user to easily confirm whether the plurality of names of a single soft button, each of which is displayed in a corresponding one of a plurality of display modes, are all accommodated in the display region of the single soft button.

The development assistance device 10 further includes an image operation reception unit 111 that receives a user operation for changing the size of the image P0 displayed by the first display control unit 141, and when the user operation is received by the image operation reception unit 111, the first display control unit 141 may display the image P0 whose size has been changed in accordance with the user operation.

According to the above configuration, the development assistance device 10 changes the size of the image P0 being displayed according to the user operation for changing the size of the image P0. Therefore, the development assistance device 10 has an effect of enabling the user to easily confirm whether the plurality of character strings CS being displayed are all accommodated in the image P0 whose size has been changed by changing the size of the image P0 being displayed in accordance with the user operation. In other words, the development assistance device 10 has an effect of enabling the user to easily determine the size of the image P0 (that is, the display region) in which none of the plurality of character strings CS being displayed protrude.

The development assistance device 10 further includes a character operation reception unit 112 that receives a user operation for changing at least one of the character font and the character size of at least one character string CS of the plurality of character strings CS displayed by the second display control unit 142. When the user operation is received by the character operation reception unit 112, the second display control unit 142 may change at least one of the character font and the character size of the character string CS being a target of the user operation in accordance with the user operation, and display the changed character string CS.

According to the above configuration, in accordance with a user operation for changing at least one of the character font and the character size of an arbitrary character string CS of the plurality of character strings CS, the development assistance device 10 changes at least one of the character font and the character size of the character string CS being a target of the user operation, and displays the changed character string CS.

Therefore, the development assistance device 10 has an effect of changing at least one of the character font and the character size of an arbitrary character string CS being displayed in accordance with the user operation, thereby enabling the user to easily confirm whether the changed character string CS is accommodated in the image P0. In other words, the development assistance device 10 has an effect of enabling the user to easily determine the character font and the character size of an arbitrary character string CS being displayed so that the arbitrary character string CS is accommodated in the image P0.

The development assistance device 10 may further include a setting information output unit 160 (output unit) that outputs, to the outside, the character font and character size of each of the plurality of character strings CS displayed by the second display control unit 142 as the character font and character size of each of the plurality of character strings CS, and the size of the image P0 displayed by the first display control unit 141 as the size of the display region common to the plurality of character strings CS, when the user confirms that the plurality of character strings CS are all accommodated in the image P0.

According to the above configuration, the development assistance device 10 outputs, to the outside, the character font and character size of each of the displayed character strings CS as the character font and character size of each of the plurality of character strings CS, and the size of the displayed image P0 as the size of the display region common to the plurality of character strings CS.

Therefore, the development assistance device 10 can output, to the outside, the size of the common display region in which all of the plurality of character strings CS are accommodated, and the character font and character size of each of the plurality of character strings CS that are accommodated in the display region.

The overview of the development assistance device 10 has been described above. Next, the details of the configuration of the development assistance device 10 is described with reference to FIG. 1, and then the processing executed by the development assistance device 10 is described with reference to FIG. 3.

(Details of Development Assistance Device)
(Major Differences from Conventional Development Assistance Device)

As described with reference to FIG. 9, a conventional development assistance device displays, at a certain time point, only one of a plurality of character strings CS that can be displayed over the image P0, for example, only the character string CS1 or the character string CS2.

That is, the conventional development assistance device displays either the English character string CS1 or the Spanish character string CS2 over the image P0 in the editing screen at a certain time point. The conventional development assistance device does not display the plurality of character strings CS over the image P0 simultaneously at one time.

In contrast, the development assistance device 10 displays all of the plurality of character strings CS that can be displayed over the image P0, at one time, over the image P0. Therefore, the user does not need to switch the display mode (for example, language mode) to find out the longest character string CS of the plurality of character strings CS. By simply glancing at the plurality of character strings CS that are simultaneously displayed over the image P0, the user can confirm whether the plurality of character strings CS are accommodated in the common display region. In other respects, the development assistance device 10 is the same as the conventional development assistance device.

The development assistance device 10 displays, on a display unit 150, an editing screen for editing and adjusting display settings of each of "a plurality of character strings CS displayed in a common display region by the HMI 30 according to the display mode". The size of the image P0 displayed in the editing screen by the development assistance device 10 corresponds to "the size of the display region commonly allocated to the plurality of character strings CS by the HMI 30". The character font and character size of each of the plurality of character string CS displayed in the editing screen by the development assistance device 10 correspond to "the character font and character size of each of the plurality of character string CS when displayed by the HMI 30". The image P0 and the plurality of character strings CS displayed in the editing screen by the development assistance device 10 correspond to "the display region commonly allocated to the plurality of character strings CS by the HMI 30" and "the plurality of character strings CS that can be displayed by the HMI 30 for each display mode selected by the user". The plurality of character strings CS and the image P0 displayed in the editing screen by the development assistance device 10 may be a reduced or enlarged version of "the plurality of character strings CS displayed by the HMI 30" and "the display region commonly allocated to the plurality of character strings CS by the HMI 30".

(Detailed Configuration of Development Assistance Device)

FIG. 1 is a block diagram showing a main configuration of the development assistance device 10. As shown in FIG. 1, the development assistance device 10 includes an operation reception unit 110, a setting information update unit 120, a storage unit 130, a display control unit 140, the display unit 150, and the setting information output unit 160 as functional blocks.

In addition to the above-mentioned functional blocks, the development assistance device 10 may include a programming assistance unit (not shown) or the like, which provides an environment for the user to program a user program as a control program to be executed by the PLC 20 according to a control purpose. However, in order to ensure the brevity of the description, the configuration not directly related to the present embodiment is omitted from the description and the block diagram. However, the development assistance device 10 may include the omitted configuration according to the actual implementation.

The display unit 150 is a display device such as a display or the like, and displays an editing screen or the like described later according to an instruction from the display control unit 140. The operation reception unit 110, the setting information update unit 120, the display control unit 140, and the setting information output unit 160 can be implemented, for example, by the central processing unit (CPU) or the like reading a program stored in the storage device (the storage unit 130) implemented by a read only memory (ROM), a non-Volatile random access memory (NVRAM), or the like to a random access memory (RAM) (not shown) or the like and executing the program. Hereinafter, the operation reception unit 110, the setting information update unit 120, the display control unit 140, and the setting information output unit 160 in the development assistance device 10 are described.

The operation reception unit 110 receives the user operation and notifies the setting information update unit 120 of the content (operation content) of the received user operation. The operation reception unit 110 includes the image operation reception unit 111 and the character operation reception unit 112.

The image operation reception unit 111 receives the user operation for changing the size of the image P0 displayed in the editing screen, and notifies the content of the received user operation to a display range determination unit 121 of the setting information update unit 120.

The character operation reception unit 112 receives the user operation for changing at least one of the character font and the character size of each of the plurality of character strings CS displayed in the editing screen, and notifies the content of the received user operation to a character setting determination unit 122 of the setting information update unit 120. The character operation reception unit 112 may receive a user operation for changing each of the plurality of character string CS displayed in the editing screen, or may notify the content of the received user operation to the character setting determination unit 122 of the setting information update unit 120.

The setting information updating unit 120 updates at least one of first setting information 131 and second setting information 132 stored in the storage unit 130 according to the operation content notified from the operation reception unit 110. The setting information update unit 120 includes the display range determination unit 121 and the character setting determination unit 122.

The display range determination unit 121 updates the first setting information 131 stored in the storage unit 130 according to the operation content notified from the image operation reception unit 111. For example, when the image operation reception unit 111 receives "a user operation for enlarging the size of the image P0", the display range determination unit 121 increases a value indicating the size of the image P0 defined by the first setting information 131. Similarly, when the image operation reception unit 111 receives "a user operation for reducing the size of the image P0," the display range determination unit 121 reduces the value indicating the size of the image P0 defined by the first setting information 131.

The character setting determination unit 122 updates the second setting information 132 stored in the storage unit 130 according to the operation content notified from the character operation reception unit 112. For example, when the character operation reception unit 112 receives "a user operation for changing the character font of the character string CS1", the character setting determination unit 122 changes a value indicating the character font of the character string CS1 defined by the second setting information 132 according to the user operation. Similarly, when the character operation reception unit 112 receives "a user operation for expanding the character size of the character string CS2", the character setting determination unit 122 increases a value indicating the character size of the character string CS2 defined by the second setting information 132. When the character operation reception unit 112 receives "a user operation for changing a character string CS", the character setting determination unit 122 may change information indicating the character string CS defined by the second setting information 132 according to the user operation.

The display control unit 140 acquires display settings related to the image P0 and each of the plurality of character strings CS by referring to the storage unit 130, and displays the image P0 and the plurality of character strings CS on the display unit 150 according to the acquired display settings. The display control unit 140 includes the first display control unit 141 and the second display control unit 142.

The first display control unit 141 displays, in the editing screen (in particular, an editing area A1), the image P0 having a size corresponding to the size of a display region commonly allocated to the plurality of character strings CS (for example, the display region commonly allocated to the plurality of character strings CS when displayed by the HMI 30).

Specifically, the first display control unit 141 acquires a display setting (in particular, the display size) of the image P0 by referring to the first setting information 131 of the storage unit 130, and displays the image P0 on the display unit 150 according to the acquired display setting.

The second display control unit 142 displays each of the plurality of character strings CS in the editing screen (in particular, in the editing area A1) in a character font and character size corresponding to "the character font and character size of each of the plurality of character strings CS displayed by the HMI 30". In particular, the second display control unit 142 simultaneously displays the plurality of character strings CS over the image P0. The second display control unit 142 may simultaneously display the plurality of character strings CS over the image P0 according to the information indicating each of the plurality of character strings CS defined by the second setting information 132 (information indicating the character strings CS).

Specifically, the second display control unit 142 acquires display settings (in particular, the character font and the character size) of each of the plurality of character strings CS by referring to the second setting information 132 of the storage unit 130, and displays each of the plurality of character strings CS on the display unit 150 according to the acquired display settings. In particular, the second display control unit 142 causes the display unit 150 to simultaneously display, over the image P0, the plurality of character strings CS, each of which is displayed according to the respective display settings.

Here, when the user selects a mode in which only a specific character string CS among the plurality of character strings CS is displayed, the second display control unit 142 may display only the specific character string CS selected by the user over the image P0. For example, when the user selects a mode in which only the character string CS1 of the plurality of character strings CS is displayed, the second display control unit 142 may display only the character string CS1 over the image P0.

In addition, the second display control unit 142 may simultaneously display all of the plurality of character strings CS over the image P0 when the user selects a mode in which all of the plurality of character strings CS are displayed (for example, "all language display mode").

When there is a user operation for instructing output of the display settings of each of the plurality of character string CS, the setting information output unit 160 outputs the display settings of each of the plurality of character string CS by referring to the storage unit 130. The setting information output unit 160 includes an image setting output unit 161 and a character setting output unit 162.

The image setting output unit 161 acquires a display setting (in particular, the display size) of the image P0 by referring to the first setting information 131 in the storage unit 130, and outputs the acquired display setting of the image P0. "The display setting (in particular, the display size) of the image P0" corresponds to "the size of the display region commonly allocated to the plurality of character strings CS by the HMI 30".

The character setting output unit 162 acquires display settings (in particular, the character font and character size) of each of the plurality of character strings CS by referring to the second setting information 132 in the storage unit 130, and outputs the acquired display settings of each of the plurality of character strings CS. The character setting output unit 162 may refer to the second setting information 132 in the storage unit 130 to acquire information indicating each of the plurality of character strings CS defined by the second setting information 132 (information indicating the character string CS), or may output each of the acquired character strings CS. The "display settings (in particular, the character font and character size) of each of the plurality of character strings CS" correspond to the "display settings (in particular, the character font and character size) of each of the plurality of character strings CS displayed by the HMI 30". Similarly, the information indicating each of the plurality of character strings CS corresponds to each of the plurality of character strings CS displayed by the HMI 30.

The storage unit 130 is a storage device that stores various data used by the development assistance device 10. Moreover, the storage unit 130 may non-temporarily store (1) a control program, (2) an OS program, (3) an application program for executing various functions of the development assistance device 10, and (4) various data to be read when the application program is executed. The data described in (1) to (4) is stored in, for example, a non-volatile storage device such as a read only memory (ROM), a flash memory, an erasable programmable ROM (EPROM), EEPROM (registered trademark) (Electrically EPROM), a hard disc drive (HDD) or the like. The development assistance device 10 may include a temporary storage unit (not shown). The temporary storage unit is a so-called working memory that temporarily stores data used for calculation, calculation results, or the like in the process of various processing executed by the development assistance device 10, and is constituted of a volatile storage device such as a random access memory (RAM). Which data is to be stored in which storage device is determined as appropriate based on the purpose of use of the PLC 20, convenience, cost, physical constraints, or the like. The storage unit 130 further stores the first setting information 131 and the second setting information 132.

The first setting information 131 is information indicating the display setting (in particular, the display size) of the image P0, and is information corresponding to "the size of the display region commonly allocated to the plurality of character strings CS by the HMI 30".

The second setting information 132 is information indicating the display settings (in particular, the character font and character size) of each of the plurality of character string CS, and is information corresponding to "the display settings (in particular, the character font and character size) of each of the plurality of character strings CS displayed by the HMI 30". The second setting information 132 may also include information indicating each of the plurality of character strings CS (information indicating the character strings CS).

§ 3. Operation Example

Figure 3:
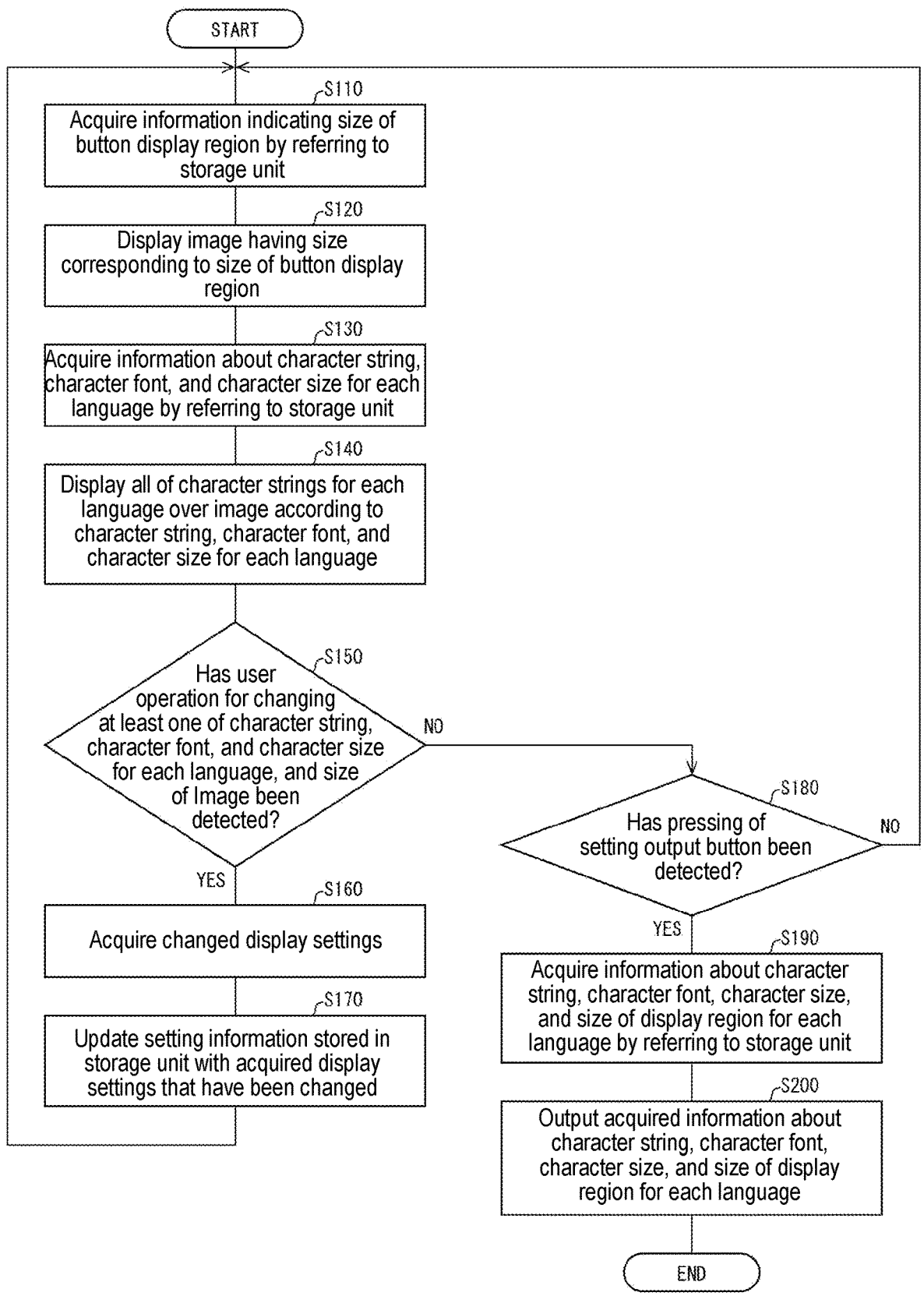
FIG. 3 is a flow chart showing an example of processing executed by the development assistance device of FIG. 2.

FIG. 3 is a flow chart showing an example of processing executed by the development assistance device 10. Specifically, FIG. 3 shows a flow of processing executed by the development assistance device 10 when the user adjusts the display settings of the GUI component (for example, the soft button) to be displayed on the multi-language HMI 30. In the following description, the "soft button" may be simply abbreviated as "button".

As shown in FIG. 3, the first display control unit 141 acquires information indicating the size of a display region of the button (button display region) displayed by the HMI 30, that is, the size of the image P0 (display size), by referring to the first setting information 131 in the storage unit 130 (S110). Next, the first display control unit 141 displays, in the editing screen, the image P0 having a size corresponding to the size of the button display region (S120).

The second display control unit 142 acquires information about the character string CS, character font, and character size for each language (that is, for each display mode) by referring to the second setting information 132 in the storage unit 130 (S130). In other words, the second display control unit 142 acquires each of the plurality of character strings CS, the character font of each of the plurality of character strings CS, and the character size of each of the plurality of character strings CS by referring to the second setting information 132. Next, the second display control unit 142 displays all of the character strings CS for each language over the image P0 according to the acquired "character string CS, character font, and character size for each language" (S140). In other words, the second display control unit 142 simultaneously displays each of the plurality of character strings CS on the image P0 in the character font and character size set for each character string CS. The second display control unit 142 may also simultaneously display each of the plurality of character strings CS under the image P0. The second display control unit 142 only need to simultaneously display the plurality of character strings over the image P0.

The operation reception unit 110 determines whether a user operation for changing at least one of the character font for each language (that is, for each of the plurality of character strings CS), the character size for each language, and the size of the image P0 has been detected (S150).

When the operation reception unit 110 determines that the user operation for changing at least one of the character font for each language, the character size for each language, and the size of the image has been detected (Yes in S150), the following processing is executed. That is, the operation reception unit 110 acquires the changed display settings, specifically, "the changed display settings for each language (that is, the character font and character size of each of the plurality of character strings CS)" and "the changed size of the image P0" (S160). The setting information update unit 120 updates at least one of the first setting information 131 and the second setting information 132 stored in the storage unit 130 according to the changed display settings acquired from the operation reception unit 110 (S170). After the first setting information 131 and the second setting information 132 are updated by the setting information update unit 120, the processing is repeated from S110. That is, the first display control unit 141 and the second display control unit 142 display the image P0 and the plurality of character strings CS according to the updated display settings (in other words, the updated first setting information 131 and second setting information 132), respectively.

When the operation reception unit 110 determines that the user operation for changing at least one of the character font for each language, the character size for each language, and the size of the image has not been detected (No in S150), the operation reception unit 110 determines whether pressing of a setting output button has been detected (S180).

When the operation reception unit 110 determines that the pressing of the setting output button has been detected (Yes in S180), the setting information output unit 160 acquires information about "the character string, the character font, the character size, and the size of the display region" for each language by referring to the storage unit 130 (S190). In other words, the setting information output unit 160 (in particular, the character setting output unit 162) acquires each of the plurality of character strings CS and the display settings (in particular, the character font and character size) of each of the plurality of character strings CS by referring to the second setting information 132 in the storage unit 130. In addition, the setting information output unit 160 (in particular, the image setting output unit 161) acquires the display setting (in particular, the display size) of the image P0 (that is, the display region common to the plurality of character strings CS) by referring to the first setting information 131 in the storage unit 130. The setting information output unit 160 outputs the acquired information about "the character string, the character font, the character size, and the size of the display region" for each language (S200). When the operation reception unit 110 determines that the pressing of the setting output button has not been detected (No in S180), the processing is repeated from S110.

The processing executed by the development assistance device 10 (in other words, the control method executed by the development assistance device 10) that has been described above with reference to FIG. 3 can be organized as follows. That is, the processing (control method) executed by the development assistance device 10 is a method for controlling a development assistance device that assists a user in examining display settings of each of a plurality of character strings, each of which is displayed in a corresponding one of a plurality of display modes. This method includes: an image display step (S120) in which the image P0 having a size corresponding to the size of the display region commonly allocated to the plurality of character strings CS is displayed; and a character display step (S140) in which the plurality of character strings CS are simultaneously displayed over the image P0 displayed by the image display step.

According to the above configuration, in the control method, the plurality of character strings CS are simultaneously displayed over the image P0. Therefore, the control method has an effect of enabling the user to easily confirm whether all of the character strings CS each of which is displayed in a corresponding one of a plurality of display modes are accommodated in the display region commonly allocated to the plurality of character strings CS.

Here, each of the plurality of display modes may be, for example, an English display mode, a Japanese display mode, a Chinese display mode, a Spanish display mode, or the like for multi-language support. In addition, each of the plurality of display modes may be, for example, a display mode for expert or a display mode for beginner, which is selected by the user who checks the screen in which the character string CS is displayed, depending on his/her own knowledge, experience, skill level, or the like in regard to an object to be confirmed.

Example of Editing Screen

Figure 4:
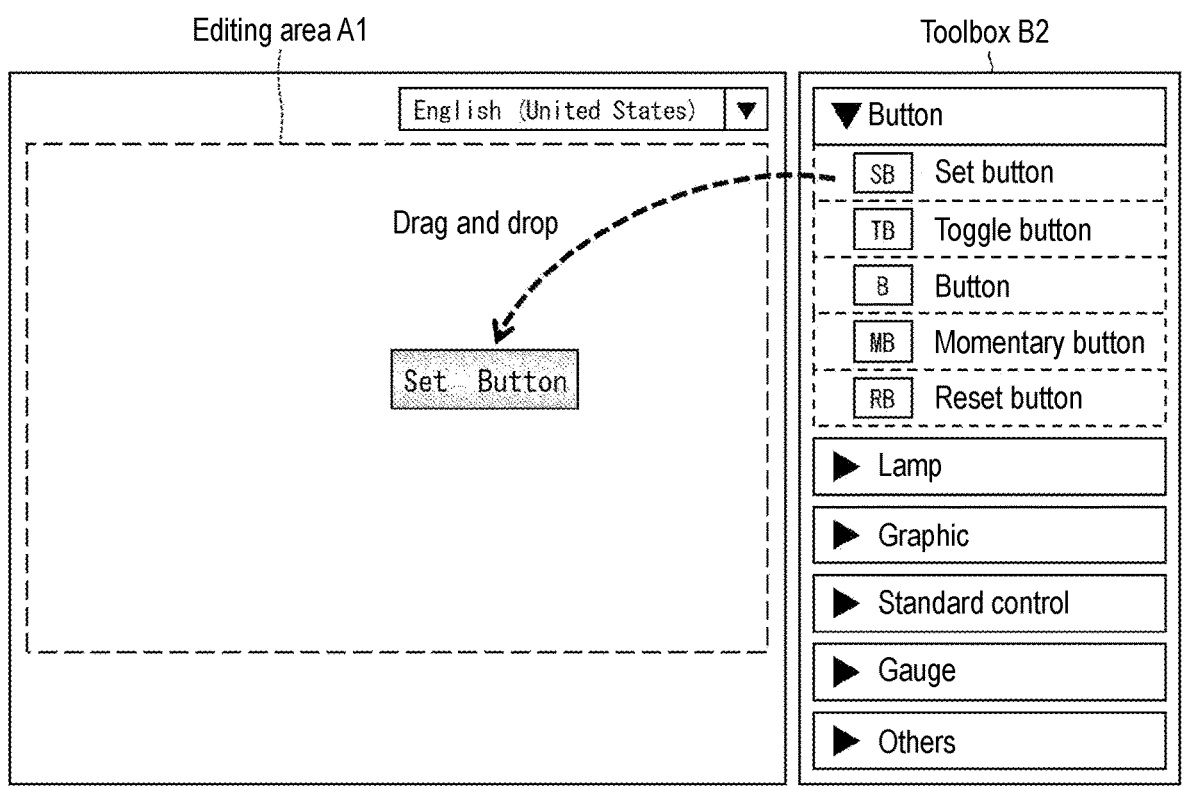
FIG. 4 is a diagram illustrating an example of an editing screen displayed by the development assistance device of FIG. 1.

FIG. 4 is a diagram illustrating an example of an editing screen displayed by the development assistance device 10 (in particular, an editing screen displayed on the display unit 150 by the display control unit 140). The development assistance device 10 displays the editing screen illustrated in FIG. 4. As shown in FIG. 4, the editing screen includes the editing area A1 and a toolbox B2.

In the editing screen, the user creates the GUI component or the like to be displayed on the HMI 30 by dragging and dropping an object from the toolbox B2 to the editing area A1. The object is an object indicating the GUI component displayed by the HMI 30, such as a "button" or the like. FIG. 4 shows an example in which an object indicating a "set button (SB)" is dragged and dropped into the editing area A1.

The character string CS displayed on the object can be set for each of a plurality of display modes that can be select for the HMI 30, for example, for each language that can be select for the multi-language HMI 30. In the example shown in FIG. 4, the user can also select a display mode from a combo box displayed in the upper right of the editing area A1, that is, the user can select a character string CS displayed in the editing area A1.

Example of Overlapped Display of Multiple Character Strings

Figure 5:
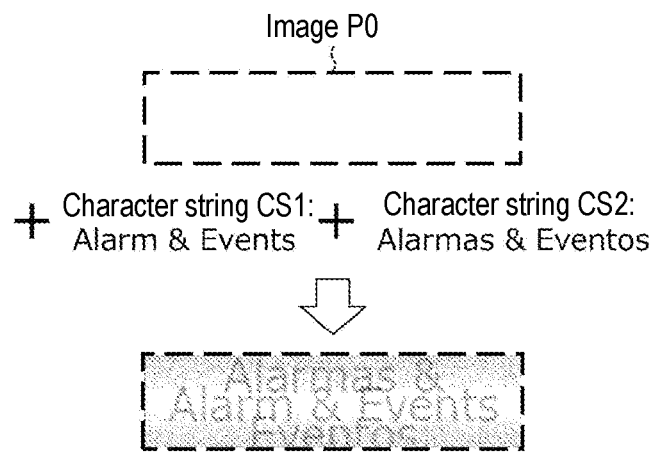
FIG. 5 is a diagram showing an example of a plurality of character strings displayed in the editing screen of FIG. 4.
Figure 5:
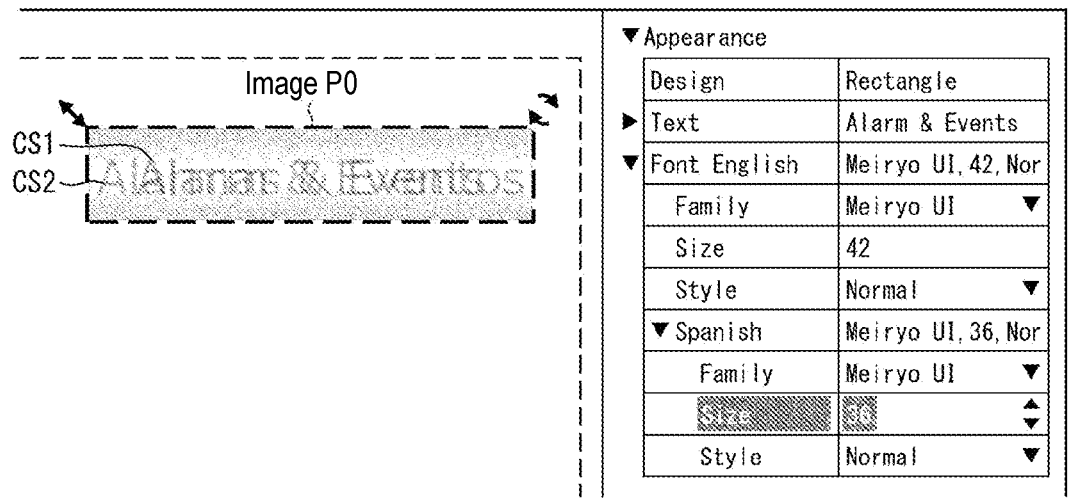
Figure 5:
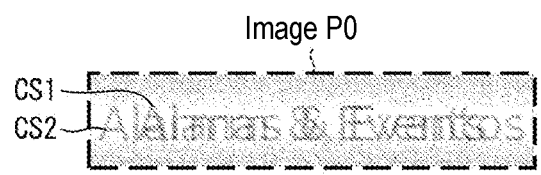

FIG. 5 is a diagram showing an example of a plurality of character strings CS displayed by the development assistance device 10 (in particular, the second display control unit 142). In the editing screen (in particular, the editing area A1), the development assistance device 10 (in particular, the second display control unit 142) simultaneously displays all of the plurality of character strings CS (for example, the plurality of character strings CS, each of which is written in a corresponding one of a plurality of selectable languages) over the image P0 in a semi-transparent color.

The development assistance device 10 simultaneously displays all of the plurality of character strings CS over the image P0 in a semi-transparent color and thereby the user can confirm the longest character string CS of the plurality of character strings CS at a glance. Therefore, the user can easily adjust the size of the image P0 corresponding to, for example, "the size of the display region commonly allocated to the plurality of character strings CS by the HMI 30" based on the longest character string CS of the plurality of character strings CS.

In addition, when "the size of the display region commonly allocated to the plurality of character strings CS by the HMI 30" cannot be changed, the efficiency of user' work for adjusting at least one of the character font and character size of each of the plurality of character strings CS can also be improved by using the development assistance device 10.

Figure 9:
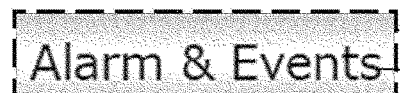
FIG. 9 is a diagram illustrating a method for a user to adjust display settings of each of a plurality of character strings by using a conventional development assistance device.
Figure 9:
Figure 9:

When the conventional development assistance device illustrated in FIG. 9 is used, the user displays each of the plurality of character strings CS one by one and adjusts at least one of the character font and character size of each of the plurality of character strings CS so as to accommodate the character strings CS in the display region having a fixed size.

In contrast, because the development assistance device 10 simultaneously displays all of the plurality of character strings CS over the image P0, the user can confirm at a glance a character string CS among the plurality of character strings CS that is not accommodated in the display region having a fixed size, that is, the image P0 having a fixed size. The user only needs to adjust at least one of the character font and character size of the character string CS that is not accommodated in the image P0.

(A) of FIG. 5 shows a state in which the second display control unit 142 simultaneously displays an English character string CS1 (Alarm & Events) and a Spanish character string CS2 (Alarmas & Eventos) over the image P0 in a semi-transparent color. For example, as shown in (A) of FIG. 5, when the size of the image P0 is set based on the character string CS1, the character string CS2, which is longer than the character string CS1, is not accommodated in the image P0, but is displayed in a folded manner, and the character string CS2 is displayed with a part missing.

In (A) of FIG. 5, the user can confirm at a glance that "Alarmas & Eventos" is longer than "Alarm & Events", that is, the character string CS2 is longer than the character string CS1.

As shown in (B) of FIG. 5, the user adjusts at least one of the size of the image P0, the character font of the character string CS2, and the character size of the character string CS2 in the editing screen so that the character string CS2, which is longer than the character string CS1, is accommodated in the image P0. In other words, the user can easily adjust, for example, the size of the image P0 to a size that allows both the character string CS1 and the character string CS2 to be accommodated together, by means of the character string CS1 and the character string CS2 that are simultaneously displayed over the image P0 by the second display control unit 142. In addition, the user can easily adjust, for example, at least one of the character font and the character size of the character string CS2 so that the character string CS2 is accommodated in the image P0, by means of the character string CS1 and the character string CS2 that are simultaneously displayed over the image P0 by the second display control unit 142.

(C) of FIG. 5 shows a state in which at least one of the size of the image P0, the character font of the character string CS2, and the character size of the character string CS2 has been adjusted, and both the character string CS1 and the character string CS2 are accommodated in the image P0.

As shown in FIG. 5, in the development assistance device 10, the second display control unit 142 may superimpose and display all of the plurality of character strings CS in a semi-transparent color.

According to the above configuration, the development assistance device 10 superimposes and displays all of the plurality of character strings CS in a semi-transparent color. For example, the development assistance device 10 simultaneously displays all of the character strings CS1 to CS4, which are English, Spanish, Japanese, and Chinese character strings with semi-transparent colors, over the image P0. Therefore, the development assistance device 10 has an effect of enabling the user to easily confirm whether the plurality of character strings CS are all accommodated in the image P0.

Other Examples of Overlapped Display of Multiple Character Strings

Example of Overlapped Display with all Different Colors

Figure 6:
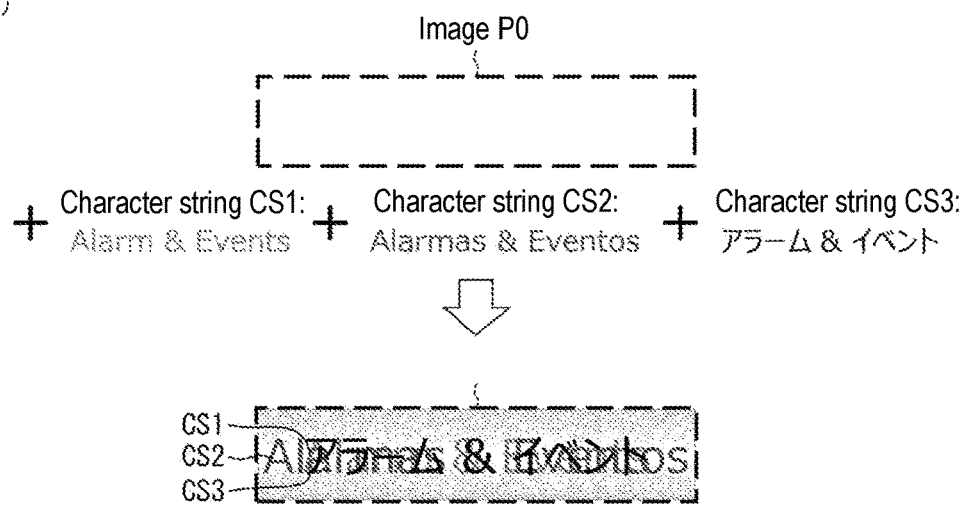
FIG. 6 is a diagram showing an example of a plurality of character strings displayed in the editing screen of FIG. 4, which is different from the example shown in FIG. 5.
Figure 6:
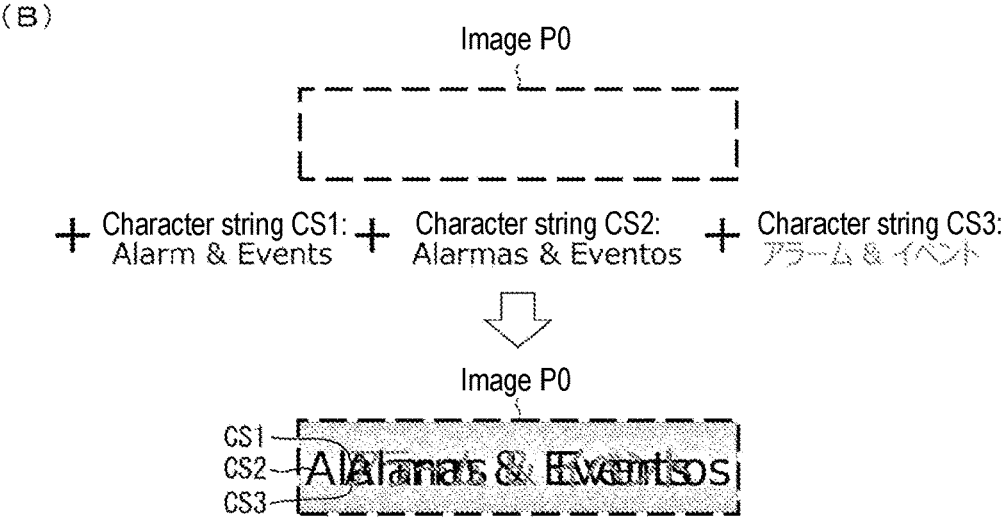

FIG. 6 is a diagram showing an example of a plurality of character strings CS displayed by the development assistance device 10 (in particular, the second display control unit 142), which is different from the example shown in FIG. 5. In the example shown in FIG. 5, the second display control unit 142 simultaneously displays the character string CS1 and the character string CS2 over the image P0 in a semi-transparent color. In the example shown in (A) of FIG. 6, the second display control unit 142 performs the following processing when displaying the character string CS1 (Alarm & Events) written in English, the character string CS2 (Alarmas & Eventos) written in Spanish, and the character string CS3 (アラーム& イベント) written in Japanese. That is, the second display control unit 142 simultaneously displays all of the character string CS1 with red color, the character string CS2 with blue color, and the character string CS3 with black color over the image P0.

As shown in (A) of FIG. 6, in the development assistance device 10, the second display control unit 142 may superimpose and display the plurality of character strings CS in different colors. In the example shown in (A) of FIG. 6, the second display control unit 142 simultaneously displays all of the plurality of character strings CS over the image P0 in different colors.

According to the above configuration, the development assistance device 10 superimposes and displays the plurality of character strings CS in different colors. For example, the development assistance device 10 simultaneously displays all of the character strings CS1 to CS4, which are English, Spanish, Japanese, and Chinese character strings with different colors (for example, blue, red, yellow, and black), over the image P0.

Therefore, the development assistance device 10 has an effect of enabling the user to easily specify the character string CS (for example, the character string CS3) that is not accommodated in the image P0, in addition to confirming whether or not the plurality of character strings CS are all accommodated in the image P0. In other words, the development assistance device 10 has an effect of enabling the user to easily grasp which character string CS of the plurality of character strings CS is not accommodated in the image P0.

Example of Overlapped Display with Longest Character String in Specific Color

In the example shown in (B) of FIG. 6, the second display control unit 142 performs the following processing when displaying the character string CS1 (Alarm & Events) written in English, the character string CS2 (Alarmas & Eventos) written in English, and the character string CS3 (アラーム& イベント) written in Japanese. That is, the second display control unit 142 attaches a specific color (for example, red) to the longest character string CS (for example, the character string CS3) among the character strings CS1, CS2, and CS3, and simultaneously displays all of the character strings CS1, CS2, and CS3 over the image P0.

As shown in (B) of FIG. 6, in the development assistance device 10, the second display control unit 142 may set the longest character string CS of the plurality of character strings CS to a predetermined color, and superimpose and display the plurality of character strings CS. In the example shown in (B) of FIG. 6, the second display control unit 142 attaches a red color to the character string CS3, which is the longest character string CS of the character strings CS1, CS2, and CS3, and simultaneously displays the character strings CS1, CS2 and CS3 over the image P0.

According to the above configuration, the development assistance device 10 sets the longest character string CS (for example, the character string CS3) of the plurality of character strings CS to the predetermined color, and superimposes and displays the plurality of character strings CS. For example, the development assistance device 10 attaches a red color to the longest character string CS of the plurality of character strings CS, and a color other than red to the other character strings CS, and simultaneously displays the plurality of character strings CS over the image P0.

Therefore, the development assistance device 10 has an effect of enabling the user to easily confirm whether the longest character string CS of the plurality of character strings CS is accommodated in the image P0.

Example of Display of Character String Divided into Multiple Lines

Figure 7:
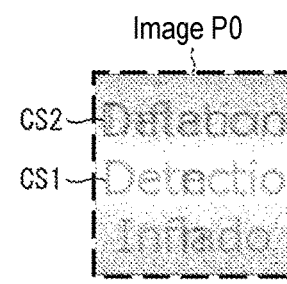
FIG. 7 is a diagram showing an example in which a plurality of character strings, each of which is displayed in multiple lines, are all made into a semi-transparent color and superimposed and displayed simultaneously.
Figure 7:
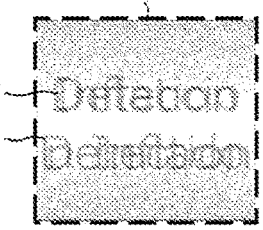
Figure 8:
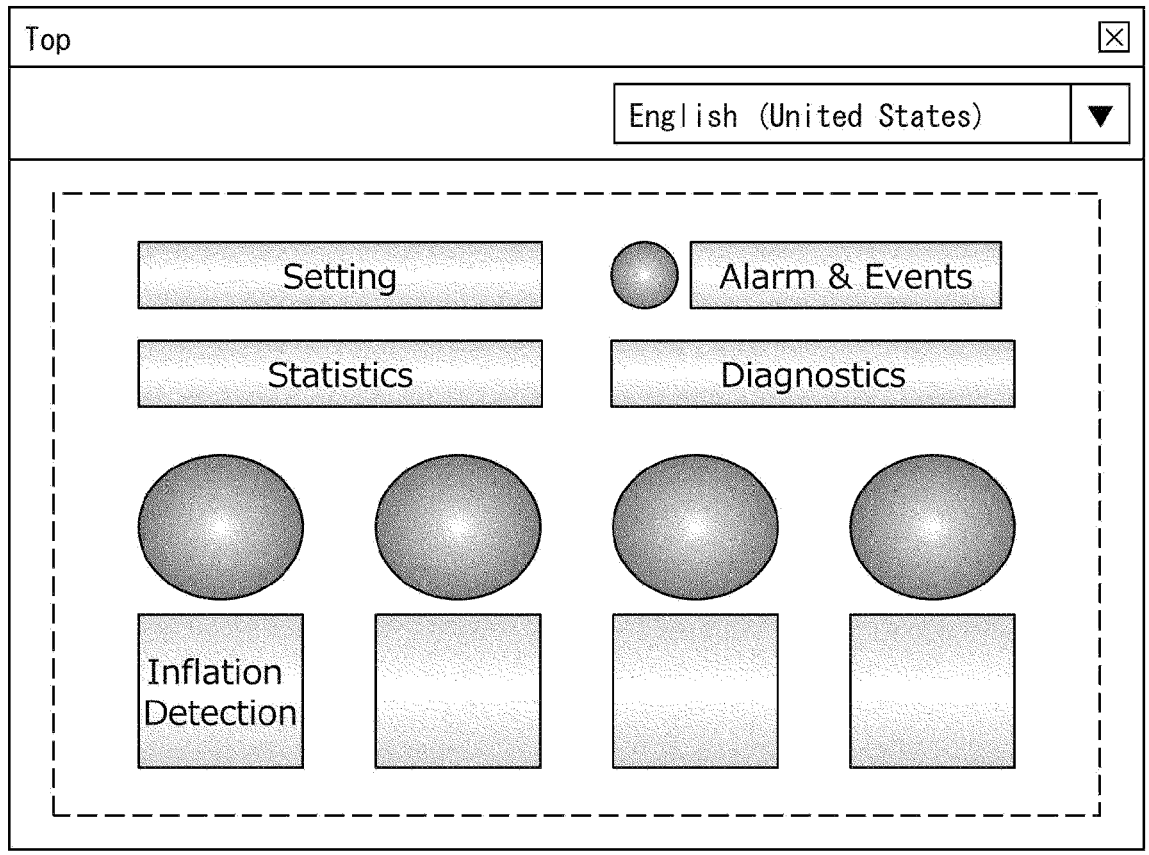
FIG. 8 is a diagram showing an example of a screen displayed by a multi-language HMI when an English display mode is selected.

FIG. 7 is a diagram showing an example in which a plurality of character strings CS each being displayed in multiple lines are all set into a semi-transparent color and simultaneously displayed over the image P0. Similar to a case of displaying each of the plurality of character strings CS in a single line, the second display control unit 142 also simultaneously displays all of the plurality of character strings CS over the image P0 in a case of displaying each of the plurality of character strings CS in multiple lines. For example, the second display control unit 142 simultaneously displays all of the plurality of character strings CS, each of which is displayed in multiple lines, over the image P0 in a semi-transparent color.

In the example shown in FIG. 7, the second display control unit 142 simultaneously displays an English character string CS1 (Inflation Detection) and a Spanish character string CS2 (Deteccion Inflado) as follows. That is, the second display control unit 142 sets each of the character string CS1 and the character string CS2 to a semi-transparent color, and simultaneously displays the character string CS1 and the character string CS2 over the image P0.

In (A) of FIG. 7, because the size of the image P0 is set based on the English character string CS1 which is displayed in two lines, the character string CS2 is displayed in three lines instead of being accommodated in the image P0, and the display of the character string CS2 is partially missing.

The user adjusts at least one of the size of the image P0, the character font of the character string CS2, and the character size of the character string CS2 so that the character string CS2 which is longer than the character string CS1 is accommodated in the image P0.

Similar to the example shown in FIG. 5, the user can easily adjust, for example, the size of the image P0 to a size that allows both the character string CS1 and the character string CS2 to be accommodated together, by means of the character string CS1 and the character string CS2 that are simultaneously displayed over the image P0 by the second display control unit 142. As a result of adjusting the size of the image P0, as shown in (B) of FIG. 7, both the character string CS1 and the character string CS2, each of which is divided into two lines, are accommodated in the image P0.

The user can easily adjust, for example, at least one of the character font and the character size of the character string CS2 so that the character string CS2 is accommodated in the image P0, by means of the character string CS1 and the character string CS2 that are simultaneously displayed over the image P0 by the second display control unit 142.

§ 4. Variation Example

An example in which the HMI 30 is a programmable display has been described above, but the HMI 30 does not need to be a programmable display. The development assistance device 10 may be an information processing device that supports a user in adjusting display settings of a plurality of character strings, "each of which is displayed in a common display region on a display such as the HMI 30 or the like in a corresponding one of a plurality of display modes". The development assistance device 10 is an information processing device that supports the user in adjusting the size of the common display region, the character font of each of the plurality of character strings CS, the character size of each of the plurality of character strings CS, and the like in regard to the plurality of character strings.

In addition, the development assistance device 10 does not need to include the display unit 150. The development assistance device 10 may use the HMI 30 in place of the display unit 150. That is, the display control unit 140 may acquire display settings related to the image P0 and each of the plurality of character strings CS by referring to the storage unit 130, and display the image P0 and the plurality of character strings CS on the HMI 30 according to the acquired display settings.

Example of Implementation by Software

The functional blocks of the development assistance device 10 (specifically, the operation reception unit 110, the setting information update unit 120, the display control unit 140, and the setting information output unit 160) may be implemented by a logic circuit (hardware) formed in an integrated circuit (IC chip) or the like, or may be implemented by software using a central processing unit (CPU).

When the functional blocks of the development assistance device 10 is implemented by software using a central processing unit (CPU), the development assistance device 10 includes a CPU that executes instructions of a program being software that realizes each function, a read only memory (ROM) or a storage device (referred to as "recording media") in which the above program and various data are recorded to be readable by a computer (or CPU), a random access memory (RAM) that deploys the above program, and the like. Besides, the object of the present invention is achieved by using the computer (or CPU) to read the above program from the recording media and execute the program. The recording media may be a "non-temporary tangible medium", such as a tape, a disk, a card, a semiconductor memory, a programmable logic circuit, or the like. In addition, the above program may be supplied to the computer via any transmission medium capable of transmitting the program (communication network, broadcast wave, or the like). Further, the present invention may also be realized in a form of a data signal embedded in a carrier wave, in which the above program is embodied by electronic transmission.

(Appendix Information)

The development assistance device according to one aspect of the present invention is a development assistance device that assists a user in examining display settings of each of a plurality of character strings, each of which is displayed in a corresponding one of a plurality of display modes. The development assistance device includes: an image display unit that displays an image having a size corresponding to the size of a display region that is commonly allocated to the plurality of character strings; and a character display unit that simultaneously displays the plurality of character strings over the image displayed by the image display unit.

According to the above configuration, the development assistance device simultaneously displays the plurality of character strings over the image. Therefore, the development assistance device has an effect of enabling the user to easily confirm whether all of the plurality of character strings each of which is displayed in a corresponding one of a plurality of display modes are accommodated in the display region commonly allocated to the plurality of character strings.

Here, each of the plurality of display modes may be, for example, an English display mode, a Japanese display mode, a Chinese display mode, a Spanish display mode, or the like for multi-language support. In addition, each of the plurality of display modes may be, for example, a display mode for expert or a display mode for beginner, which is selected by the user who checks the screen in which the character string is displayed, depending on his/her own knowledge, experience, skill level, or the like in regard to an object to be confirmed.

In the development assistance device according to one aspect of the present invention, the size of the display region is the size of the display region of the graphical user interface (GUI) component, and each of the plurality of character strings may be a character string indicating the name of the GUI component and written in a corresponding one of a plurality of languages.

According to the above configuration, the development assistance device simultaneously displays all of the plurality of character strings, each of which indicates the name of the GUI component, over the image that has a size corresponding to the size of the display region of the GUI component such as a soft button or the like.

Therefore, the development assistance device has an effect of enabling the user to easily confirm whether the plurality of names of the GUI component, each of which is displayed in a corresponding one of a plurality of display modes, are all accommodated in the display region of the GUI component. For example, the development assistance device has an effect of enabling the user to easily confirm whether the plurality of names of a single soft button, each of which is displayed in a corresponding one of a plurality of display modes, are all accommodated in the display region of the single soft button.

The development assistance device according to one aspect of the present invention further includes an image operation reception unit that receives a user operation for changing the size of the image displayed by the image display unit, and when the user operation is received by the image operation reception unit, the image display unit may display the image whose size has been changed in accordance with the user operation.

According to the above configuration, the development assistance device changes the size of the image being displayed according to the user operation for changing the size of the image. Therefore, the development assistance device has an effect of enabling the user to easily confirm whether the plurality of character strings being displayed are all accommodated in the image whose size has been changed by changing the size of the image being displayed in accordance with the user operation. In other words, the development assistance device has an effect of enabling the user to easily determine the size of the image (that is, the display region) in which none of the plurality of character strings being displayed protrude.

The development assistance device according to one aspect of the present invention further includes a character operation reception unit that receives a user operation for changing at least one of the character font and the character size of at least one character string of the plurality of character strings displayed by the character display unit. When the user operation is received by the character operation reception unit, the character display unit may change at least one of the character font and the character size of the character string being a target of the user operation in accordance with the user operation, and display the changed character string.

According to the above configuration, in accordance with a user operation for changing at least one of the character font and the character size of an arbitrary character string, the development assistance device changes at least one of the character font and the character size of the character string being a target of the user operation, and displays the changed character string.

Therefore, the development assistance device has an effect of changing at least one of the character font and the character size of an arbitrary character string being displayed in accordance with the user operation, thereby enabling the user to easily confirm whether the changed character string is accommodated in the image. In other words, the development assistance device has an effect of enabling the user to easily determine the character font and the character size of an arbitrary character string being displayed so that the arbitrary character string is accommodated in the image.

In the development assistance device according to one aspect of the present invention, the character display unit may superimpose and display the plurality of character strings in different colors.

According to the above configuration, the development assistance device superimposes and displays the plurality of character strings in different colors. For example, the development assistance device simultaneously displays all of the character strings, which are English, Japanese, Chinese, and Spanish character strings with different colors (for example, blue, red, yellow, and black), over the image.

Therefore, the development assistance device has an effect of enabling the user to easily specify the character string that is not accommodated in the image, in addition to confirming whether or not all of the plurality of character strings are accommodated in the image. In other words, the development assistance device has an effect of enabling the user to easily grasp which language character string is not accommodated in the image.

In the development assistance device according to one aspect of the present invention, the character display unit may superimpose and display all of the plurality of character strings in a semi-transparent color.

According to the above configuration, the development assistance device superimposes and displays all of the plurality of character strings in a semi-transparent color. For example, the development assistance device simultaneously displays all of the character strings, which are English, Japanese, Chinese, and Spanish character strings with a semi-transparent color, over the image. Therefore, the development assistance device has an effect of enabling the user to easily confirm whether or not all the plurality of character strings are accommodated in the image.

In the development assistance device according to one aspect of the present invention, the character display unit may set the longest character string of the plurality of character strings to a predetermined color, and superimpose and display the plurality of character strings.

According to the above configuration, the development assistance device sets the longest character string of the plurality of character strings to the predetermined color, and superimposes and displays the plurality of character strings. For example, the development assistance device attaches a red color to the longest character string of the plurality of character strings, and a color other than red to the other character strings, and simultaneously displays the plurality of character string over the image.

Therefore, the development assistance device has an effect of enabling the user to easily confirm whether the longest character string of the plurality of character strings is accommodated in the image.

The development assistance device according to one aspect of the present invention may further include an output unit that outputs, to the outside, the character font and character size of each of the plurality of character strings displayed by the character display unit as the character font and character size of each of the plurality of character strings, and the size of the image displayed by the image display unit as the size of the display region common to the plurality of character strings, when the user confirms that the plurality of character strings are all accommodated in the image.

According to the above configuration, the development assistance device outputs, to the outside, the character font and character size of each of the displayed character strings as the character font and character size of each of the plurality of character strings, and the size of the displayed image as the size of the display region common to the plurality of character strings.

Therefore, the development assistance device can output, to the outside, the size of the common display region in which all of the plurality of character strings are accommodated, and the character font and character size of each of the plurality of character strings that are accommodated in the display region.

The control method according to one aspect of the present invention is a method for controlling a development assistance device that assists a user in examining display settings of each of a plurality of character strings, each of which is displayed in a corresponding one of a plurality of display modes. This method includes: an image display step in which an image having a size corresponding to the size of a display region commonly allocated to the plurality of character strings is displayed; and a character display step in which the plurality of character strings are simultaneously displayed over the image displayed by the image display step.

According to the above configuration, in the control method, the plurality of character strings are simultaneously displayed over the image. Therefore, the control method has an effect of enabling the user to easily confirm whether all of the character strings each of which is displayed in a corresponding one of a plurality of display modes are accommodated in the display region commonly allocated to the plurality of character strings.

Here, each of the plurality of display modes may be, for example, an English display mode, a Japanese display mode, a Chinese display mode, a Spanish display mode, or the like for multi-language support. In addition, each of the plurality of display modes may be, for example, a display mode for expert or a display mode for beginner, which is selected by the user who checks the screen in which the character string is displayed, depending on his/her own knowledge, experience, skill level, or the like in regard to an object to be confirmed.

The present invention is not limited to the embodiments described above, and various modifications can be made within the scope of the claims, and the embodiments obtained by appropriately combining the technical means respectively disclosed in the different embodiments are also included in the technical scope of the present invention.

The invention claimed is:

1. A development assistance device that assists a user in examining display settings of each of a plurality of character strings, wherein each of the plurality of character strings is displayed in a corresponding one of a plurality of display modes, the development assistance device comprising:
a processor configured to:
control a display to display an image having a size corresponding to a size of a display region commonly allocated to the plurality of character strings;
control the display to simultaneously display the plurality of character strings over the image, wherein the plurality of character strings overlap, and the plurality of character strings and the image overlap, the processor controls the display to superimpose and display all of the plurality of character strings in a semi-transparent color, the plurality of character strings comprises three or more character strings, the size of the display region is a size of a display region of a GUI component,
receive a first user operation for changing the size of the image displayed by the display, wherein when the first user operation is received by the processor, control the display to display the image with the size of the image changed in accordance with the first user operation; and
receive a second user operation for changing at least one of a character font and a character size of at least one character string of the plurality of character strings displayed by the display, wherein when the second user operation is received by the processor, the processor changes at least one of the character font and the character size in accordance with the second user operation, and controls the display to display a changed character string.

2. The development assistance device according to claim 1, wherein each of the plurality of character strings is a character string indicating a name of the GUI component and written in a corresponding one of a plurality of languages.

3. The development assistance device according to claim 1, wherein the processor controls the display to superimpose and display the plurality of character strings in different colors.

4. The development assistance device according to claim 1, wherein the processor sets a longest character string of the plurality of character strings to a predetermined color, and controls the display to superimpose and display the plurality of character strings.

5. The development assistance device according to claim 1, the processor configured to output, to the outside, a character font and a character size of each of the plurality of character strings displayed by the display as the character font and the character size of each of the plurality of character strings, and a second size of the image as the size of the display region commonly allocated to the plurality of character strings, when the user confirms that the plurality of character strings are all accommodated in the image.

6. A method for controlling a development assistance device that assists a user in examining display settings of each of a plurality of character strings, wherein each of the plurality of character strings is displayed in a corresponding one of a plurality of display modes, the method comprising:
an image display step in which an image having a size corresponding to a size of a display region commonly allocated to the plurality of character strings is displayed,
a character display step in which the plurality of character strings are simultaneously displayed over the image, wherein the plurality of character strings overlap, the plurality of character strings and the image overlap, and all of the plurality of character strings are superimposed and displayed in a semi-transparent color, the plurality of character strings comprises three or more character strings, the size of the display region is a size of a display region of a GUI component,
an image operation reception step in which a first user operation for changing the size of the image displayed by the image display step is received, wherein when the first user operation is received by the image operation reception step, displaying the image with the size of the image changed in accordance with the first user operation in the image display step; and
a character operation reception step in which a second user operation for changing at least one of a character font and a character size of at least one character string of the plurality of character strings displayed by the character display step is received, wherein when the second user operation is received by the character operation reception step, changing at least one of the character font and the character size in accordance with the second user operation, and displaying a changed character string in the character display step.

7. A non-transitory computer readable recording medium storing an information processing program causing a computer to execute a process for controlling a development assistance device that assists a user in examining display settings of each of a plurality of character strings, wherein each of the plurality of character strings is displayed in a corresponding one of a plurality of display modes, the process comprising:
controlling a display to display an image having a size corresponding to a size of a display region commonly allocated to the plurality of character strings;
controlling the display to simultaneously display the plurality of character strings over the image, wherein the plurality of character strings overlap, the plurality of character strings and the image overlap, and all of the plurality of character strings are superimposed and displayed in a semi-transparent color, the plurality of character strings comprises three or more character strings, the size of the display region is a size of a display region of a GUI component,
receiving a first user operation for changing the size of the image displayed by the display, wherein when the first user operation is received, controlling the display to display the image with the size of the image changed in accordance with the first user operation; and
receiving a second user operation for changing at least one of a character font and a character size of at least one character string of the plurality of character strings displayed by the display, wherein when the second user operation is received, changing at least one of the character font and the character size in accordance with the second user operation, and controlling the display to display a changed character string.

* * * * *